United States Patent [19]

Frost

[11] Patent Number: 4,979,889

[45] Date of Patent: Dec. 25, 1990

[54] EXTRUSION DIE FOR MINI-MONOLITH SUBSTRATE

[75] Inventor: Rodney I. Frost, Corning, N.Y.

[73] Assignee: Corning Incorporated, N.Y.

[21] Appl. No.: 371,895

[22] Filed: Jun. 27, 1989

Related U.S. Application Data

[62] Division of Ser. No. 220,543, Jul. 18, 1988, Pat. No. 4,877,766.

[51] Int. Cl.⁵ .............................................. B29C 47/12
[52] U.S. Cl. ........................... 425/192 R; 264/177.12; 264/177.16; 425/380; 425/461; 425/464
[58] Field of Search ................... 425/192 R, 461, 464, 425/467, 190, 380, 462, 463; 264/177.12, 177.16, 209.1

[56] References Cited

U.S. PATENT DOCUMENTS

| | | | |
|---|---|---|---|
| 3,609,808 | 10/1971 | Jacobi et al. | 425/192 R |
| 3,837,783 | 9/1974 | Bagley | 425/464 |
| 3,856,448 | 12/1974 | Iijima et al. | 425/381 |
| 4,343,604 | 8/1982 | Minjolle | 425/461 |
| 4,798,526 | 1/1989 | Briggs et al. | 425/192 R |

*Primary Examiner*—Jay H. Woo
*Assistant Examiner*—James P. Mackey
*Attorney, Agent, or Firm*—Thomas J. Greer, Jr.; Richard N. Wardell

[57] ABSTRACT

A rigid mini-monolith structure formed by extrusion from a die. Such structures are useful as catalyst supports for treating exhaust gases from automobile. The structure is in the shape of a right circular cylinder with a plurality of internal cells extending along the substrate and an opening on both ends. In order to provide maximum crushing strength of the structure, as well as permitting uniform intercell wall thickness at the downstream face of the extrusion die which forms the structure, the majority of the cells are formed in the transverse cross section of a truncated (circular) sector and have the property that they each possess the same hydraulic diameter, although not all are of the same transverse cross sectional shape. The invention also is defined by a novel extrusion die formed by a plurality of concentric, collared tubes provided with longitudinally running slots in the tubes and notches on the collars, the tubes being radially spaced from each other. The non-slotted portions of the tubes define the cells of the extruded structure.

7 Claims, 4 Drawing Sheets

EXTRUSION DIE FOR MINI-MONOLITH SUBSTRATE

The Application is a divisional application of Ser. No. 07/220,543 filed July 18, 1988, entitled MINI-MONOLITH SUBSTRATE, now U.S. Pat. No. 4,877,766 issued Oct. 31, 1989.

BACKGROUND OF THE INVENTION

This invention relates to a rigid mini-monolith structure which displays particular utility as a catalyst support, heat exchange media, and to a novel die construction for its formation. Such structures are generally relatively small and are usually formed by the extrusion of ceramic, cermet, glass, glass-ceramic, and metal powder or particulate material, and/or organic polymer or other suitable material from a die. Examples of similar structures which function as catalyst supports are shown in U.S. Pat. Nos. 4,054,702 issued to Lundsager et al, 4,328,130 issued to Kyan, and 4,510,261 issued to Pereira. While apparently satisfactory for the function of a catalyst support, the structures shown in the Kyan and Pereira patents do not appear to maximize the available surface area on which the catalyst is placed for treatment of exhaust gases, for example. Further, neither they nor other prior disclosures teach how to maximize surface area while at the same time maximizing crushing strength of the structure.

SUMMARY OF THE INVENTION

According to the practice of this invention, a rigid mini-monolith, having a longitudinal axis, curved sides and flat or contoured ends, is provided with a plurality of internally disposed, longitudinally running open ended cells, wherein the thickness of the radial walls between at least a majority of the nearest neighbor cells is substantially constant and uniform. Each cell is of uniform transverse cross section throughout its own length, but not all of the cells are the same transverse cross section; however, all of the cells have the same hydraulic diameter.

The radial walls improve the crushing strength of the structure as compared to a rectangular or square honeycomb structure having the same cell density. According to this invention, a majority of the cells are so formed that in transverse cross section they are truncated circular sectors. The remaining cells are, in transverse cross section, sectors of a circle. All of the sectors, including the truncated circular sectors, have equal hydraulic diameters and therefore each cell exhibits the same flow resistance to gas or a liquid that is passing through it as any of the other cells. The structure is preferably in the form of a right circular cylinder with the cells extending parallel to the longitudinal axis of the cylinder. This shape ensures that the contact between adjacent structures, as for example when used as a catalyst support in a container, will be either line or point contact. Were the structure polygonal in transverse cross section, surface to surface contact would often result between touching structures, with consequent diminution of gas contact area due to diminished surface area available for contact with a gas to be treated.

Further in accordance with the practice of this invention, a novel extrusion die is formed by a plurality of concentric rigid tubes, each slotted along a portion of its length and each provided, at the die input face, with an integral, radially extending collar. Each collar has a plurality of extending notches uniformly angularly disposed around its periphery, each collar being of different longitudinal thickness and nesting within a counterbore in its next radially outward neighboring or adjacent collar. A plurality of angularly spaced slots run partially longitudinally by each tube. Each slot extends through its respective tube wall, the exterior surface of each tube, except for the radially outermost tube, is radially spaced from the interior surface of the next adjacent radial outer tube. A rigid holder has a central bore which runs longitudinally through it, the holder opening has a counterbore at an end which receives the radially outermost collar. The bore of the holder is radially spaced from the exterior of the outermost tube, whereby a plurality of passageways is defined for the passage of an extrudable substance from the notches on the collars to the noncollared ends of the tubes. A structure which has a plurality of longitudinally running cells can be extruded from the die. The material to be extruded from the die, such as any of those previously mentioned, is fed into the openings defined by the collar notches and is extruded from the output of downstream ends of the slots in the tubes.

By forming the slots in the tubes in such a manner that their facing edges are parallel, and by making all of the slots of uniform width, the remaining, non-slotted portions of the tubes define, upon extrusion, the cells of the extrudate which exhibit uniform hydraulic diameter in transverse cross section, the latter being the structure of this invention.

The notches, which are on the peripheries of the collars, are formed such that their sides are parallel, and the notches extend completely through their respective collars, in a longitudinal direction. The slots extend completely through the longitudinal thickness of the tube. Except for the radially innermost collar, each collar has a counterbore. This counterbore receives the next adjacent radially innermost collar, except for the noted exception of the radially innermost collar.

While displaying particular utility in forming the structure of this invention having the described hydraulic diameter property, the die of this invention also exhibits utility in forming extrudates of other cell shapes and patterns. For example, the angular spacing between the slots of any tube may be varied as desired, as well as the slant of the facing edges of the slots. Further, the slots of different tubes may be of different angular spacing and circumferential extent. Also the radial clearance between the concentric tubes may be varied to yield different circumferential wall thicknesses. Cell densities of between 100 and 1600 cells per square inch are realized by the practice of this invention.

DETAILED DESCRIPTION OF THE INVENTION

Figures 1, 2:
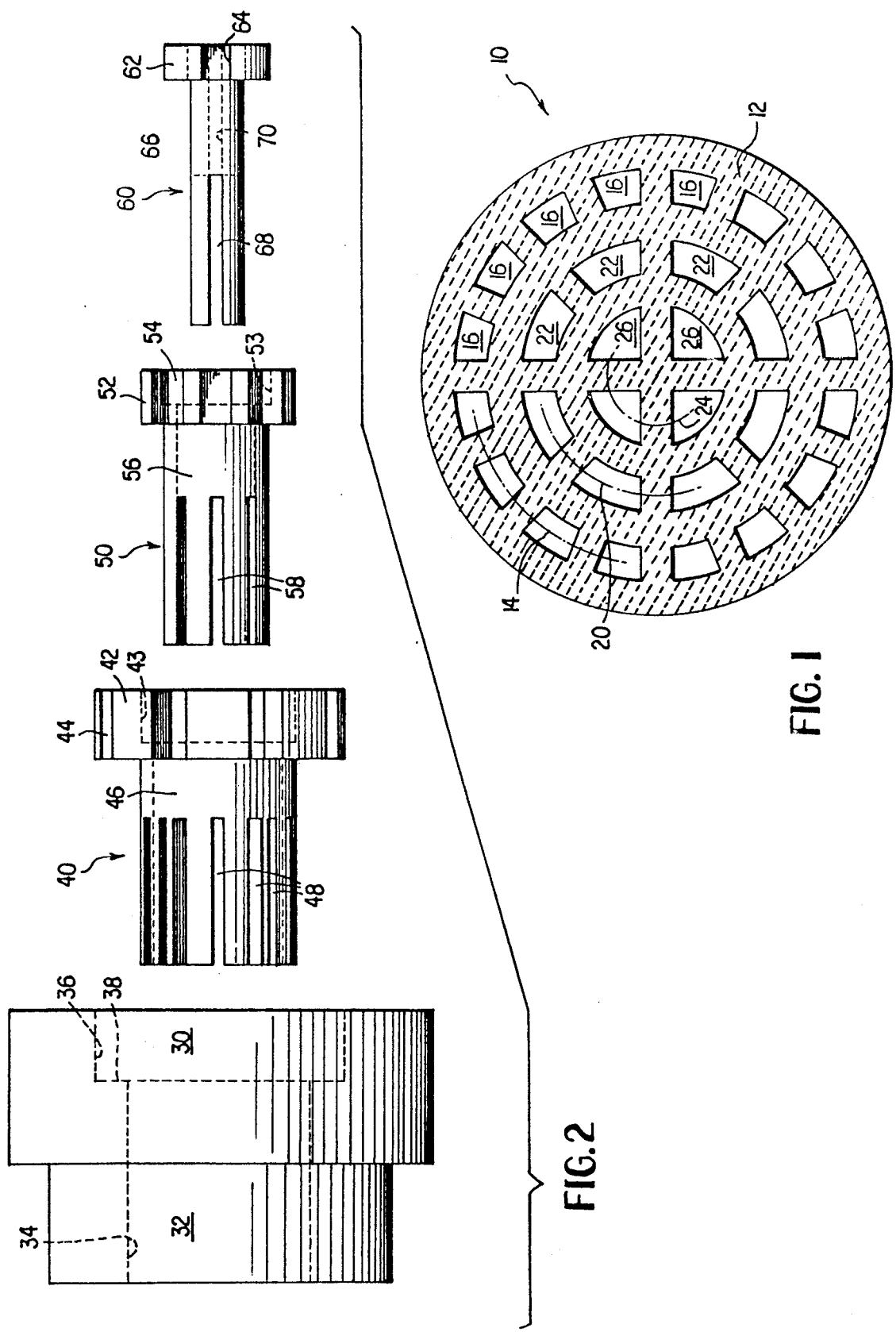
FIG. 1 is an end view of a typical extruded structure formed in accordance with this invention.
FIG. 2 is an exploded side view of the die assembly of this invention.
Figure 3:
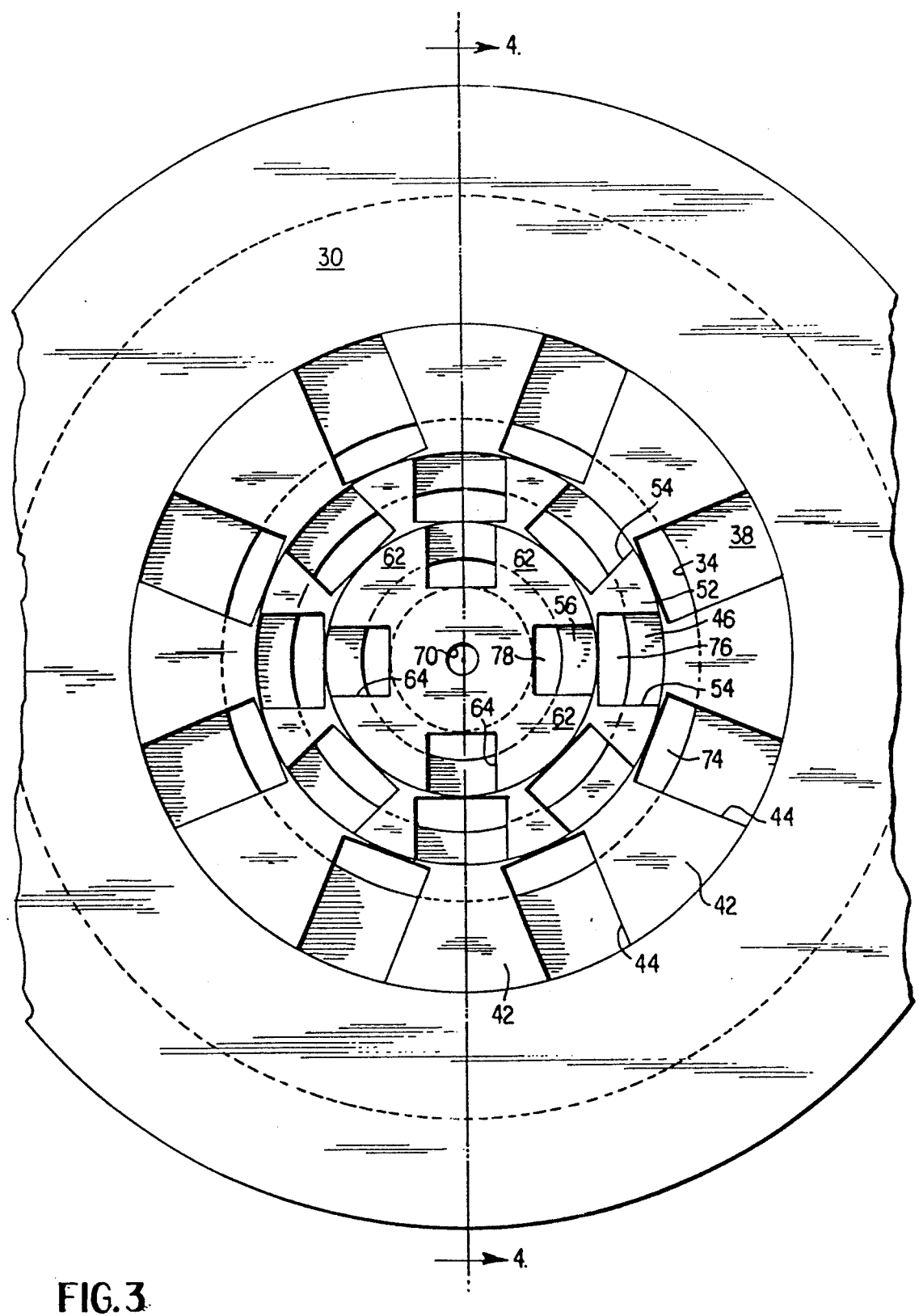
FIG. 3 is a view looking towards the die input or upstream portion of the die assembly.

Referring now to FIG. 1 of the drawings, numeral 10 denotes the structure of this invention which is formed by extruding a ceramic, metal powder, or other material through a die. The diameter of structure 10, in one example of the invention, was 0.174 inches (4.42 mm). Structure 10 is in the general form of a right circular cylinder and a typical length of the cylinder was 0.25 inches (6.35 mm). Numeral 12 denotes the circular exterior surface of the structure, and it will be understood that the ends of structure 10 are flat. The numeral 14 denotes a radially outmost ring or zone of cells 16, the numeral 20 denotes a next radially intermost zone of cells 22, while the numeral 24 denotes a radially intermost zone of cells 26. Each of the cells 16, 22 and 26 runs longitudinally through structure 10, and opens to each end face. The cells run parallel to each other.

The cross sectional area and shape of each of the cells 16, 22, and 24 is such that they all exhibit the same hydraulic diameter. The hydraulic diameter of a conduit, whether carrying a liquid or a gas, is four times the transverse cross sectional area divided by the wetted or contacted perimeter of the opening. Two differently shaped pipes, for example, if they exhibit the same hydraulic diameter, will exhibit the same resistance to flow (liquid or gas) through them.

It will be observed that the wall thickness between nearest neighbor cells is uniform. Thus, considering the radially outermost zone 14, the angular and wall thickness spacing between each of the cells 16 is uniform. Similarly, the angular spacing and wall thickness is constant for each of the cells in respective zones 20 and 24. The radial distance and wall thickness between nearest neighbor cells of the circular zones 14, 20 and 26 is also uniform. The uniformity of wall thickness between nearest neighbor cells of the structure 10 forms an important aspect of this invention.

The reader will observe that the (radially intermost) cells in zone 24 are sectors. A sector is a portion of a circle and is defined as two rays of equal lengths emanating from a common point and whose ends are connected by circular arc. The cells 22 of zone 20 and 16 of zone 14 are termed truncated sectors. A truncated sector may be considered a sector with a smaller sector removed, leaving two radii and two parallel curved lines.

Referring now to FIGS. 2-5, particularly FIG. 2, the numeral 30 denotes a holder in the form of a collar having a depending portion 32. The holder, as well as the remaining portions of the die to be described, are of rigid material which is typically metal, such as stainless steel. The numeral 34 denotes a bore through the holder, while numeral 36 denotes a counterbore to define an abutment ledge 38.

The numeral 40 denotes the first integrally collared tube element including a collar 42 having a plurality of longitudinally extending notches 44 equally angularly spaced around and longitudinally along the collar and extending to its external periphery. The numeral 46 denotes a tube having longitudinal slots 48 extending from the left or non-collared end, as shown in FIG. 2, towards and terminating short of the collar 42. The collar 42 contains a counterbore 43 to receive the collar 52 of the next tube element 50. Numeral 50 denotes a similar collared tube element, also integral, with numeral 52 denoting the collar having a counterbore 53 and the numeral 54 denoting any one of a plurality of equally angularly spaced notches along and in the external peripheral of the collar. The numeral 56 denotes the tube having a plurality of slots 58 which extend from the left or non-collared end towards the collar 52. Slots 58, as slots 48 of element 40, are also equally angularly spaced.

The numeral 60 denotes the radially intermost collared element of the die apparatus and includes a collar 62 having a plurality of four equally angularly spaced slots 64, with numeral 66 denoting the integral tube portion. The numeral 68 denotes any one of four slots spaced at 90 degrees with respect to each other. The numeral 70 denotes a bore extending from the right end to the left end of element 60. Slots 68, extend from their respective right hand terminations all the way to the left end of the tube 66.

Figure 4:
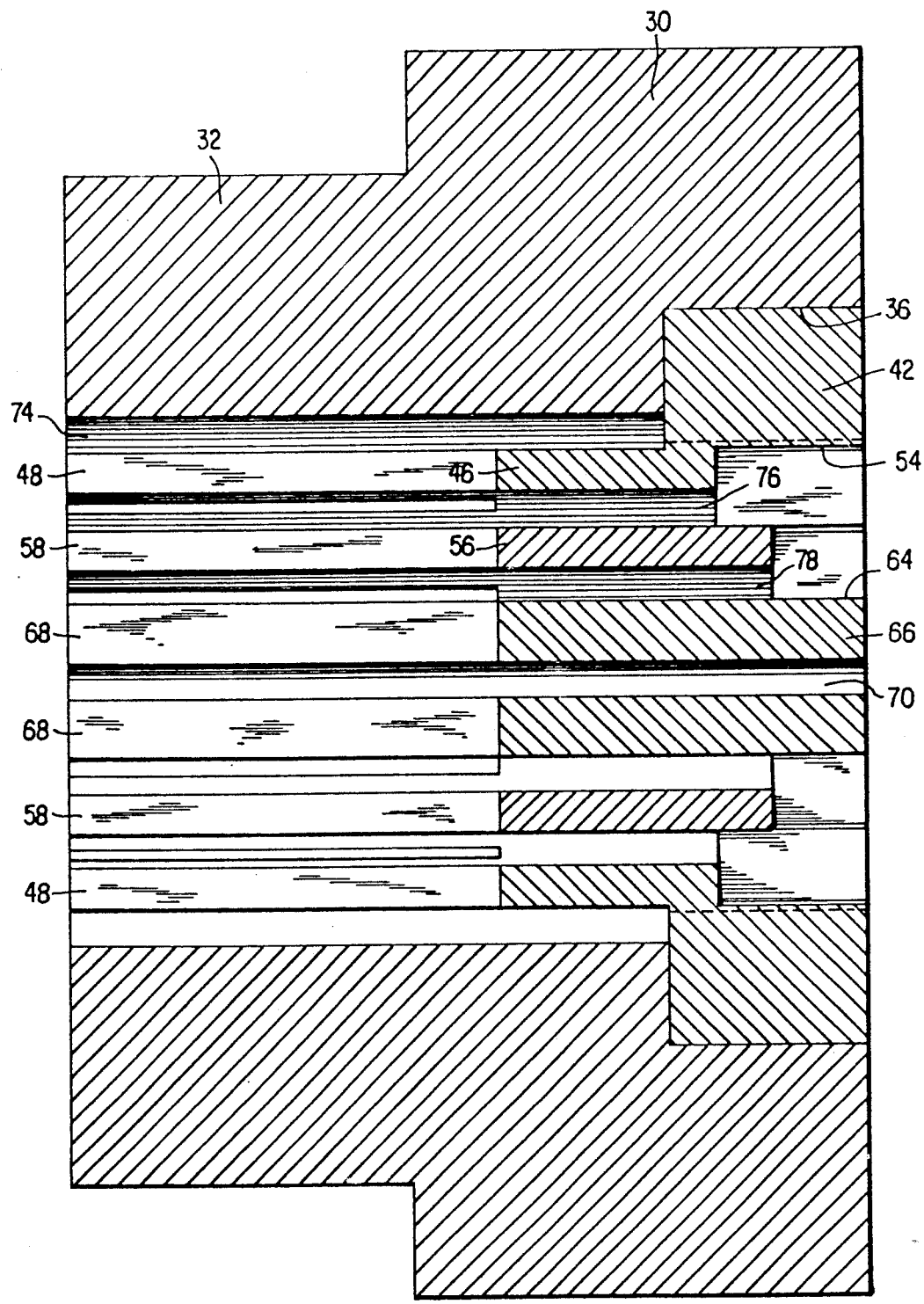
FIG. 4 is a cross sectional view taken along section 4—4 of FIG. 3.
Figure 5:
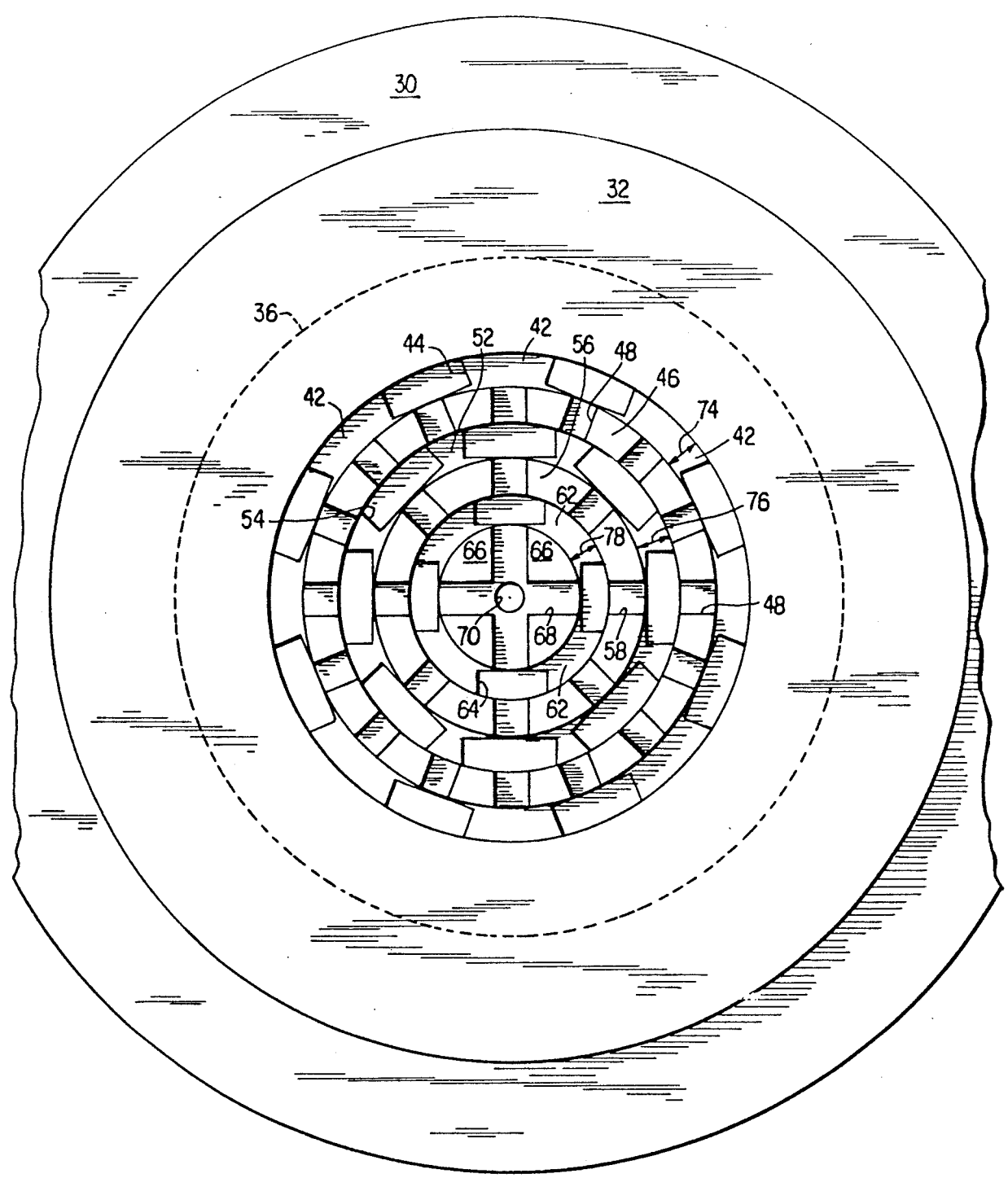
FIG. 5 is a view looking towards the output or downstream end of the die.

The elements 40, 50 and 60 are telescoped within each other, and these three elements are, in turn, received by base or holder 30. The relation is such that, as shown at FIG. 4, the right hand portion of the apparatus is the input face or upstream face, while the left hand of FIG. 4 is the discharge or downstream end. As shown at FIG. 5, the slots 68, 58 and 48 are aligned every 90 degrees, while the slots 58 and 48 are in addition aligned every 45 degrees and slots 48 are additionally aligned every 22.5 degrees. The radial distance or annular space between bore 34 and the exterior of tube 46 is denoted by the numeral 74. Similarly, numeral 76 denotes the radial distance or annular space between the interior of tube 46 and the exterior of tube 56, while 78 denotes the radial distance or annular space between the interior of tube 56 and the exterior of tube 66. These three radial distances or clearances permit the extruded material to form the three circumferentially running and radially spaced walls shown at FIG. 1.

In operation, the material to be extruded is fed to the input face of the die, passes through the openings defined by notches 64, 54, and 44, passes from right to left as shown at FIG. 4 and exits from the discharge face shown at FIG. 5. The reader will observe the exact correspondence between the size and shape of cells 16 of the radially outermost zone 14 shown at FIG. 1 and the portions of the tube 46 of element 40 which portions remain after the slots 48 have been cut into tube 46. Similarly, with respect to the second radially outermost zone 20 of FIG. 1, the reader will observe that cells or channels 22 upon extrusion exactly correspond in size and shape to the non-cut portions of tube 56, i.e., those portions which remain after the formation of slots 58 in that tube. Lastly, the reader will observe the complete correspondence between the four non-cut portions of tube 66 of element 60 which remain after the formation of slots or cuts 68 and cells 26 of FIG. 1. Bore or passageway 70 of element 60 forms the geometrical center of structure 10 shown at FIG. 1, while the slots 48, 58, 68 define the radially running walls, of uniform thickness, between the cells 16, 22, and 26 of FIG. 1. As previously noted, clearances 74, 76 and 78 form the circumferentially running walls of structure 10.

The die assembly of this invention permits the formation of extruded structure of nearly any cell pattern and size. Further, the usual die formation method involving plural hole formation in a single rigid block is transformed into a process of merely cutting slots and notches in collared tubes and then telescoping them into a holder. The counterbores on the holder and collars are dimensioned to permit a flat die input face, but this is not essential for carrying out the invention.

What is claimed is:

1. An extrusion die, said die formed of a plurality of concentric radially spaced rigid tubes each having a radially extending collar at one end thereof, said collars being of different radii, said die having a longitudinal axis about which all of the tubes are concentric, each collar having a plurality of longitudinally extending notches angularly disposed around the circumference of the collar, each collar being thicker, as measured in a longitudinal direction, than the next adjacent, radially inner collar, each collar, except for the radially innermost collar, having a counterbore which receives the radially outermost portion of the next adjacent, radially inner collar, a plurality of angularly spaced slots running partially longitudinally of each said tube, each said slot extending from the non-collared end of an associated tube toward but short of the collar of said associated tube and extending through the associated tube wall, the exterior surface of each tube, except for the radially outermost tube, being radially spaced from the interior surface of the next adjacent radially outer tube, a rigid holder having a central bore running longitudinally through it, said holder bore having a counterbore at an end thereof which receives the radially outermost collar of said collars, the bore of said holder being radially spaced from the exterior of the outermost tube, and said notches communicating with the spaces between adjacent tubes and the space between the holder and the outermost tube, whereby a plurality of passageways is defined for the passage of an extrudable substance from the notches on the collars to the non-collared ends of the tubes, and whereby a structure having a plurality of longitudinally running cells can be extruded from the die.

2. The extrusion die of claim 1 wherein facing sides of each of said slots are parallel to each other and wherein remaining, non-slotted portions of the radially innermost tube which are longitudinally coextensive with said innermost tube slots are, in transverse cross section, sectors of a circle and wherein the remaining, non-slotted portions of each other tube which are longitudinally coextensive with the slots of said each other tube are, in transverse cross section, truncated sectors of a circle.

3. The extrusion die of claim 2 wherein said slots of said tubes are all of equal width.

4. The extrusion die of claim 3 wherein the transverse cross sections of all of the non-slotted tube portions of each tube which are longitudinally coextensive with the slots of each tube are of equal hydraulic diameter.

5. The extrusion die of claim 1 wherein each tube and its associated collar and said holder are of the same length.

6. The extrusion die of claim 1 wherein each collar is integral with its associated tube.

7. The extrusion die of claim 1 wherein the bore of the radially innermost tube is unobstructed throughout the length.

* * * * *